Figure 1:
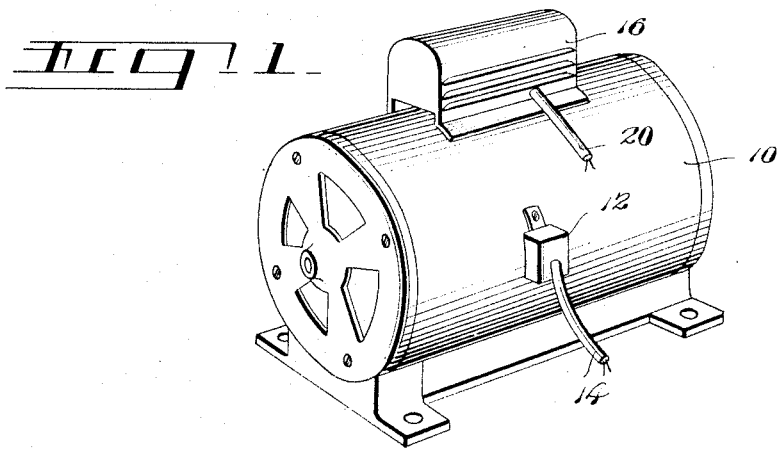

Sept. 15, 1942.  M. SCHIFF  2,295,916

ALTERNATING CURRENT MOTOR

Filed Dec. 4, 1940

Inventor
Martin Schiff
by Roy M. Eilers
atty

Patented Sept. 15, 1942

2,295,916

UNITED STATES PATENT OFFICE 2,295,916

ALTERNATING CURRENT MOTOR

Martin Schiff, St. Louis, Mo., assignor to Century Electric Company, St. Louis, Mo., a corporation of Missouri Application December 4, 1940, Serial No. 368,422

1 Claim. (Cl. 172—120)

This invention relates to improvements in alternating current motors that are used to operate milking machines. More particularly, the invention relates to improvements in alternating current motors that are used to operate milking machines which have direct current electromagnets.

It is an object of the present invention to provide an improved alternating current motor for use with milking machines which have direct current electromagnets.

Electrically operated milking machines have been known and used for some time. These machines usually consist of a vacuum pump, suction cups, a milk container, suction valves, and means to open and close the suction valves. These electrically operated milking machines ordinarily use electrical means to open and close the valves and thereby regulate the sucking action of the vacuum cups. The electrical means most commonly used to actuate the valves is an electromagnet, and in most cases, a direct current electromagnet is used. A direct current electromagnet is preferably used because it has superior operating characteristics. Direct current electromagnets have a smoother, steadier action on intermittent operation than alternating current electromagnets have. In addition, the direct current electromagnets do not chatter as many alternating current electromagnets do. Furthermore, a direct current electromagnet may have a core of hard iron which will enable the electromagnet to possess and make use of the residual magnetism in the core. The residual magnetism is helpful because its presence permits the attainment of the same pull with less power in the magnet coil. For these and many other reasons, direct current electromagnets are more desirable than alternating current magnets, and are usually the type used on milking machines. Because most of the electromagnets that are used on milking machines are operated by direct current, it was formerly deemed necessary to use direct current equipment throughout the milking machine. Since sources of direct current are not ordinarily available on all farms, the practice of equipping milking machines with direct current equipment worked a hardship on the farmer. In some cases, the farmer had to use a motor generator set to provide direct current. The necessity of having a motor generator set, quite materially increases the cost of installation of an electrical milking machine. The increased cost of installation makes this type of milking machine quite objectionable. This objection was recognized by the manufacturers of milking machines and they now make milking machines, that can be operated on alternating current. These milking machines use an alternating current motor to drive the vacuum pump and use a small direct current generator to actuate the direct current electromagnets. The direct current generator is driven by the alternating current motor to which it may be belted or geared. This type of installation operates satisfactorily but is cumbersome and expensive and, therefore, objectionable. The present invention obviates these objections by providing an alternating current motor for milking machines that has leads from which direct current may be drawn to actuate the direct current electromagnets of the milking machine. Such a motor obviates the necessity of installing an expensive motor generator set or providing a motor driven direct current generator to provide direct current for the operation of the electromagnets on milking machines. It is, therefore, an object of the present invention to provide an alternating current motor that has leads from which direct current may be drawn.

Other objects and advantages of the invention will appear from the drawing and accompanying description.

In the drawing and accompanying description, a preferred form of the invention is shown and described, but it is to be understood that the drawing and accompanying description do not limit the invention and that the invention will be defined by the appended claim.

Figure 2:
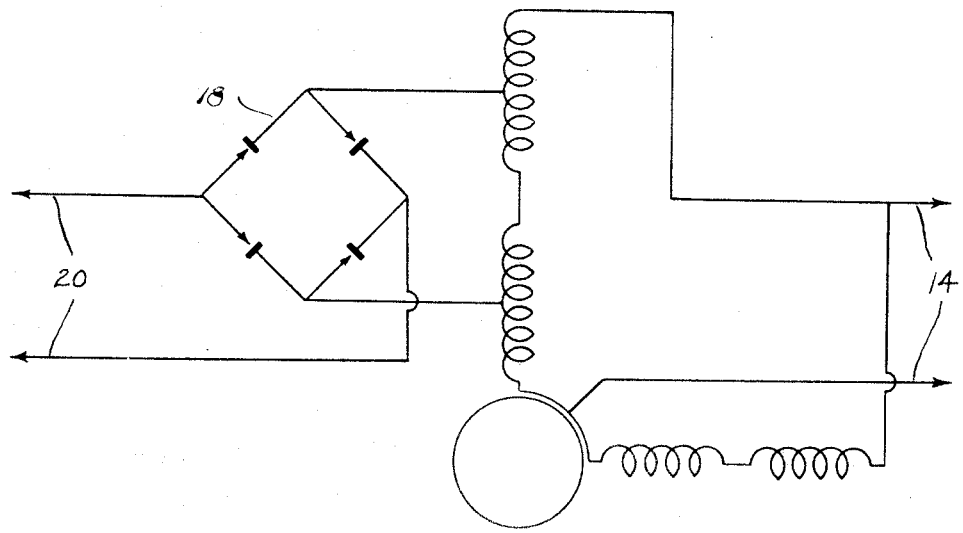

In the drawing,

Fig. 1 is a perspective view of a motor that is made in accordance with the principles of the invention, and Fig. 2 is a schematic diagram of the electric circuit of the motor shown in Fig. 1.

Referring to the drawing in detail, the frame of an alternating current motor is denoted by the numeral 10. Secured to the frame 10 is a terminal box 12 into which alternating current leads 14 may extend. Also secured to the frame 10 of the alternating current motor is a housing 16 for a rectifier 18. This housing has an opening in one side thereof from which direct current leads 20 extend. The housing that encloses the rectifier may be, as shown in the drawing, provided with openings in the sides thereof. These openings are arranged to permit air to flow into and out of the housing and dissipate the heat generated by the rectifier. The direct current that may be drawn from the leads 20 is preferably of low voltage. Low voltage direct current is secured from the alternating current motor by rectifying low voltage alternating current drawn from the motor. The low voltage alternating current may be drawn from the motor in a number of ways. One way is illustrated in the schematic diagram in Fig. 2. This diagram shows an electric circuit in the windings of the stator of the motor that is similar to an auto transformer. This method is quite simple and is preferred for that reason. Another way of providing low voltage alternating current employs a separate winding in the motor in which current may be induced. There are, however, a number of different ways to obtain low voltage alternating current, and any of these may be used. The alternating current thus obtained is then passed through the rectifier 18 and rectified into direct current. This current may then be drawn from the leads 20 to actuate the electromagnets of a milking machine.

The operation of this type of motor with an electrically operated milking machine consists in connecting the shaft of the motor with the rotary suction pump, and the connecting of leads 20 with the direct current electromagnets. The motor will then rotate the vacuum pump to create a suction which will be applied intermittently to the vacuum cups by the actuation of the direct current electromagnets. These magnets will be actuated by the direct current from the motor and will open the valves between the suction cups and the vacuum pump. An interrupter is usually located in the electric line between the direct current leads 20 and the direct current electromagnets. The interrupter provides an intermittent sucking in the vacuum cup that simulates the action used in hand milking.

By providing this type of motor, the invention makes it possible to operate an electrically actuated milking machine, having direct current electromagnets, by an alternating current motor. This is advantageous since direct current sources are not usually found on farms. It is also advantageous since it obviates the necessity of providing one means to drive the vacuum pump for the milking machine, and a separate means to electrify the direct current electromagnets.

Whereas a preferred embodiment of the invention has been shown and described in the drawing and accompanying description, it is obvious to those skilled in the art that various alterations in form may be made without altering the scope of the invention.

What I claim is:

In power driven apparatus including means requiring low voltage direct current, an alternating current driving motor having a casing and field windings therein, a housing mounted upon the motor casing, a rectifier mounted within said housing, one side of said rectifier being directly connected across a portion of said field winding to supply current to the rectifier at a voltage lower than the voltage of the motor, and the direct current side of the rectifier having leads extending through a side wall of said housing for connection to said apparatus.

MARTIN SCHIFF.